Figure 1:
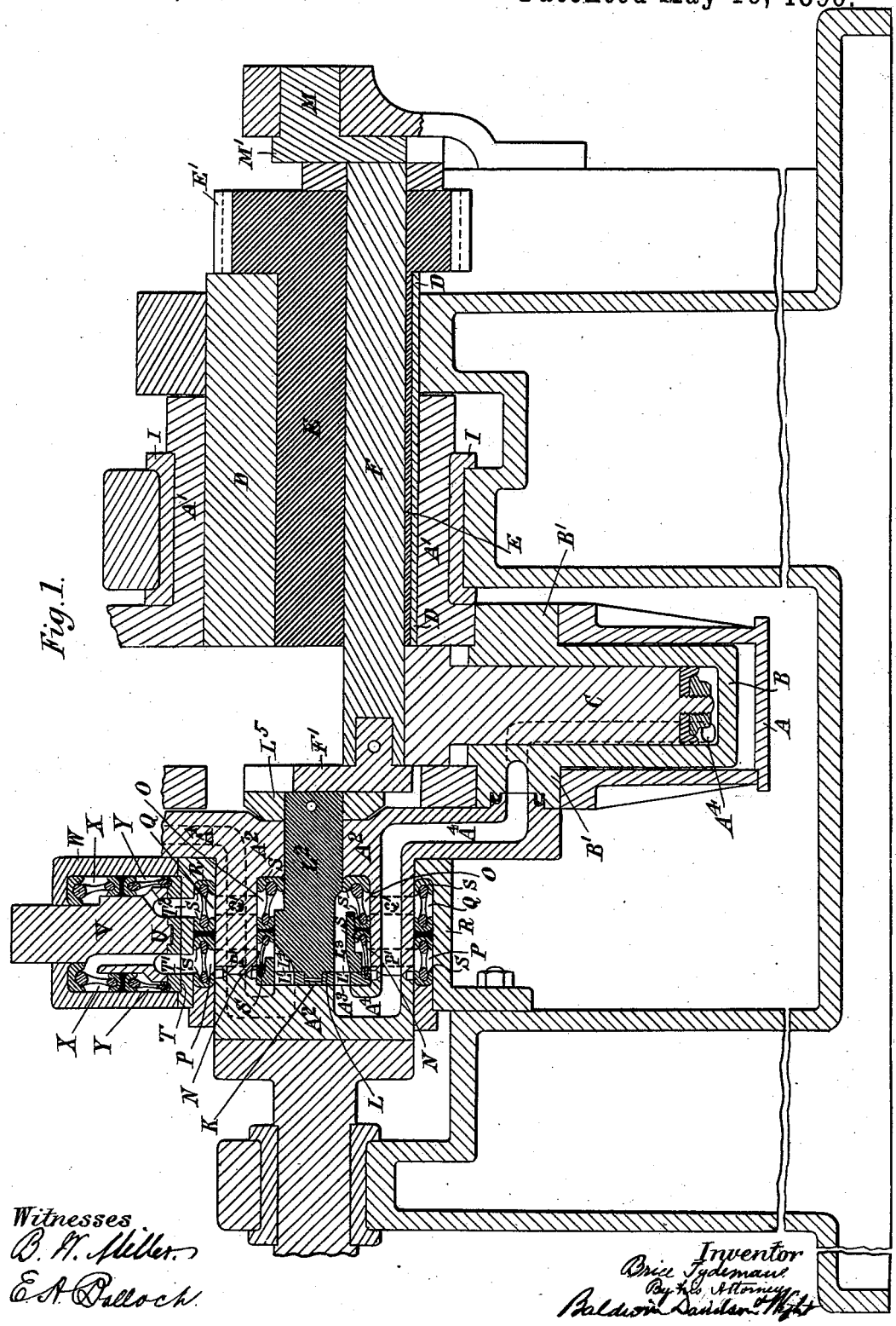

(No Model.) 5 Sheets—Sheet 1.

B. TYDEMAN.
HYDRAULIC ENGINE.

No. 560,332. Patented May 19, 1896.

Witnesses
Inventor
Brice Tydeman (No Model.) 5 Sheets—Sheet 2.
B. TYDEMAN.
HYDRAULIC ENGINE.
No. 560,332. Patented May 19, 1896.
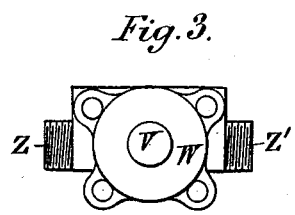
Fig. 3.
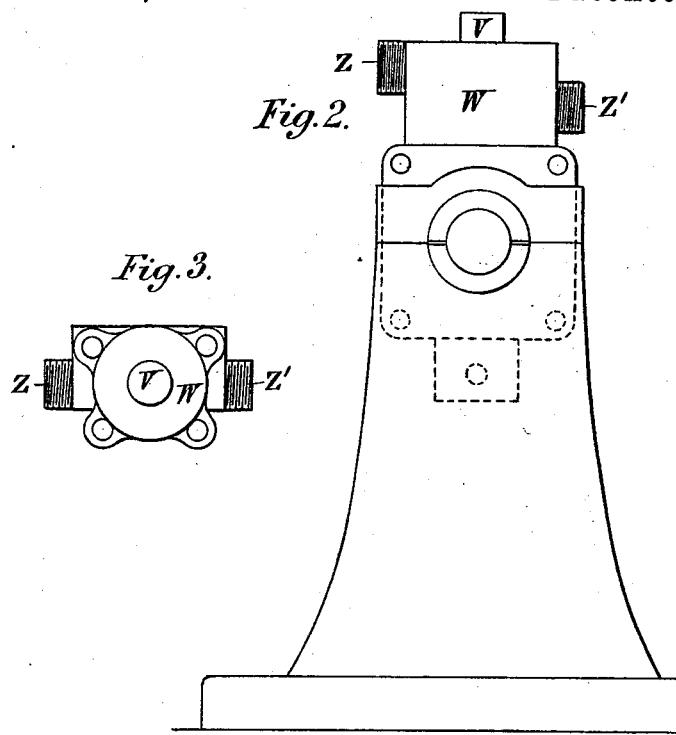
Fig. 2.
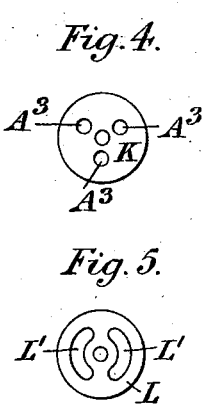
Fig. 4.
Fig. 5.
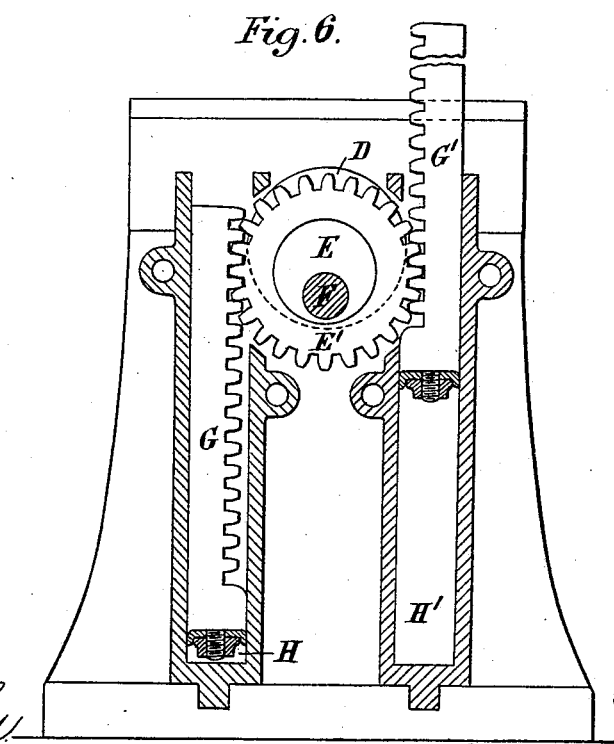
Fig. 6.
Witnesses
B. W. Miller
E. A. Balloch
Inventor
Brice Tydeman
By his Attorneys
Baldwin Davidson & Wight
ANDREW B.GRAHAM, PHOTO-LITHO, WASHINGTON, D.C.

(No Model.) 5 Sheets—Sheet 3.

B. TYDEMAN.
HYDRAULIC ENGINE.

No. 560,332. Patented May 19, 1896.

Witnesses: Inventor:

(No Model.) 5 Sheets—Sheet 4.
B. TYDEMAN.
HYDRAULIC ENGINE.

No. 560,332. Patented May 19, 1896.

Witnesses.
Inventor.

(No Model.) 5 Sheets—Sheet 5.

B. TYDEMAN.
HYDRAULIC ENGINE.

No. 560,332. Patented May 19, 1896.

Witnesses
B. W. Miller
E. A. Palloch

Inventor
Brice Tydeman
By his Attorneys
Baldwin, Davidson & Wight

UNITED STATES PATENT OFFICE.

BRICE TYDEMAN, OF LONDON, ENGLAND.

HYDRAULIC ENGINE.

SPECIFICATION forming part of Letters Patent No. 560,332, dated May 19, 1896.

Application filed December 16, 1895. Serial No. 572,309. (No model.)

*To all whom it may concern:*

Be it known that I, BRICE TYDEMAN, engineer, a subject of the Queen of Great Britain, residing at 66 Cecil Road, Upton Manor, Forest Gate, London, in the county of Essex, England, have invented certain new and useful Improvements in Hydraulic Engines, of which the following is a specification.

The object of this invention is to construct an efficient hydraulic rotating engine in which a variable length of stroke can be given to the hydraulic rams which effect the rotation, so that more or less water under pressure may be used for each rotation according as more or less power is required. To effect this, I construct the engine of a hollow wheel by which three or other number of hydraulic cylinders are carried. The cylinders can rock on trunnions and are ranged equidistantly around the axis. The rams of the hydraulic cylinders work inward against a crank-pin which passes eccentrically through a hollow tubular axis which projects from one side of the wheel. The crank-pin is kept stationary, so that the wheel revolves. The crank-pin can be brought to coincide with the axis of the wheel or be moved away from it, so making the stroke of the rams longer or shorter, as required. To do this, the hollow axis which projects from one side of the wheel is made to turn around the exterior of a fixed cylindrical axis. A hole is bored eccentrically through this fixed cylindrical axis, and through the hole passes a cylindrical rod. The crank-pin extends from the end of this rod and is eccentric to it to such an extent that by giving a half-turn to the cylindrical rod the crank-pin can be brought concentric with the axis of the wheel or moved to its greatest distance away from this axis. In this way the crank-pin is always supported close up to where the ends of the hydraulic rams bear upon it. On the opposite side of the wheel is an axis or boss through which water is admitted to and allowed to escape from the hydraulic cylinders at the proper times. A valve-face is formed on the boss. In it are formed three ports—one for each cylinder—and from each port a passage extends to the outer end of one or other of the cylinders. Against this valve-face a valve at the end of a rod is made to bear. In this valve are two ports—one supplied with fluid under pressure, the other open to the exhaust. In this way, as the wheel revolves, and the valve-face with it, while the valve is kept from rotating the end of each cylinder is alternately put into communication with the water supply and with the exhaust. If the rams of the engine were always to have the same length of stroke, the valve-rod might be kept from rotating by its end being fixed to the end of the stationary crank-pin; but in order to allow of the crank-pin being moved toward or away from the central axis of the wheel in the manner above described means are provided for causing the valve-rod to turn around the axis of the wheel to the same extent that the crank-pin is carried around this axis as it is being moved toward or away from it.

In the drawings annexed I have shown two examples of hydraulic engine constructed as above described.

In the engine shown in Figures 1 to 7 the valve-face on the axis of the revolving wheel is on the inside of the axis, which is made hollow for the purpose. In the engine shown at Figs. 8 to 16 it is on the outer face of the end of the axis, the parts being modified accordingly to admit of this.

Figure 7:
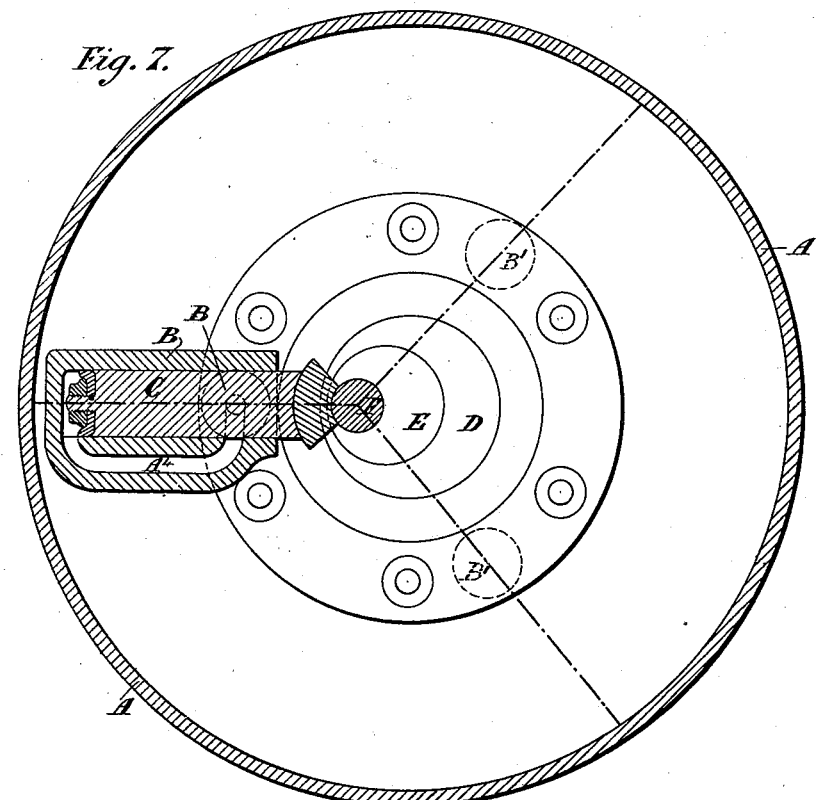
Figure 8:
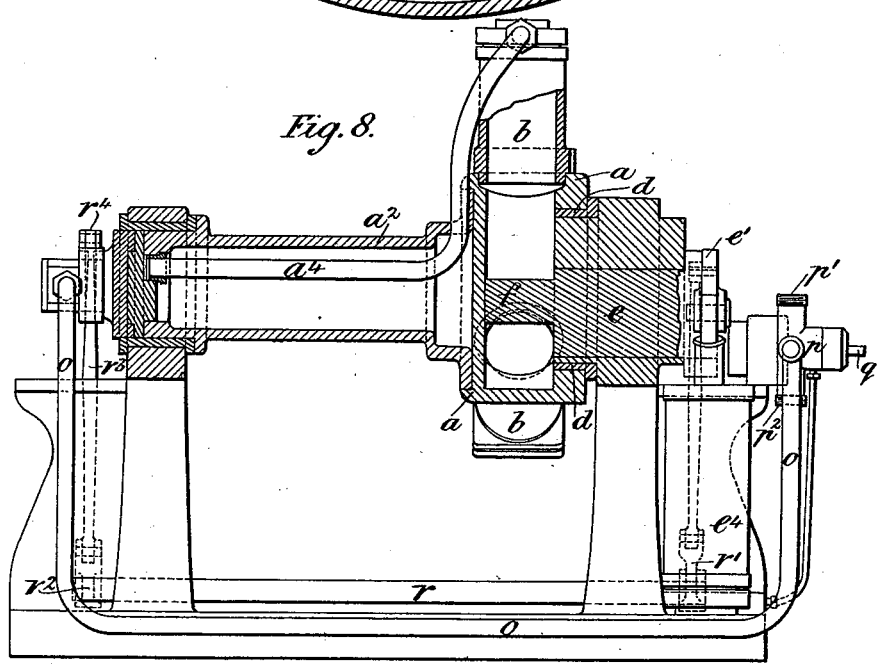
Figure 9:
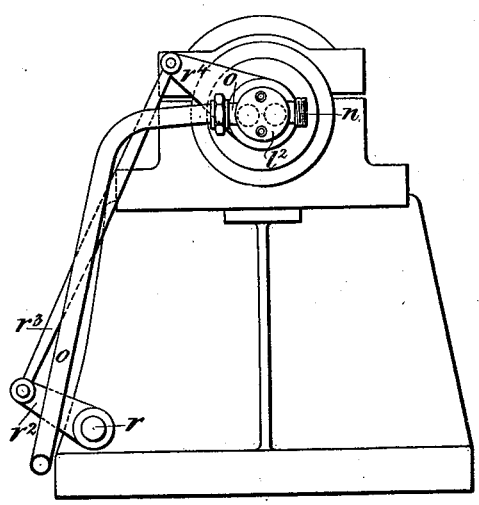
Figure 10:
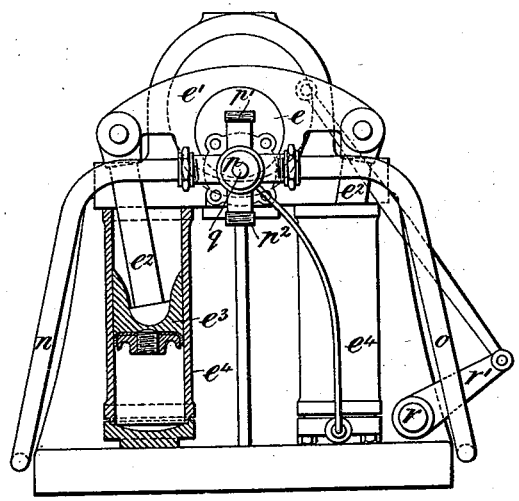
Figure 11:
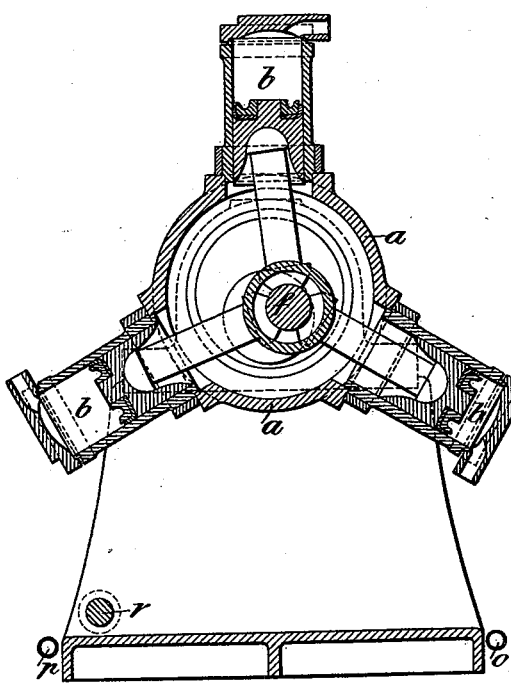
Figure 12:
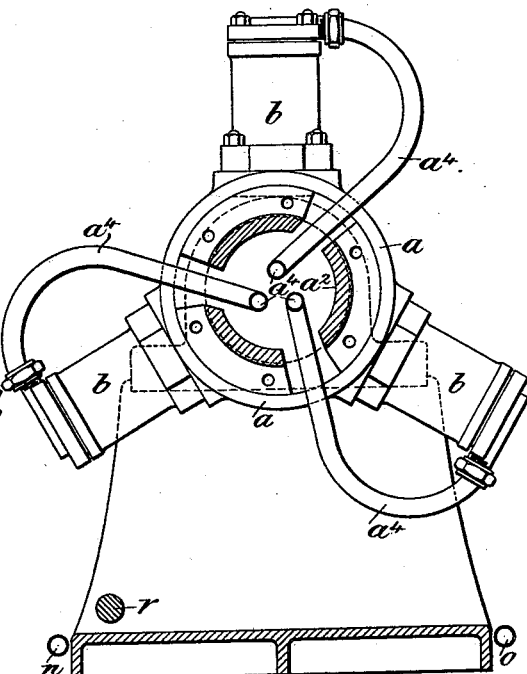
Figure 13:
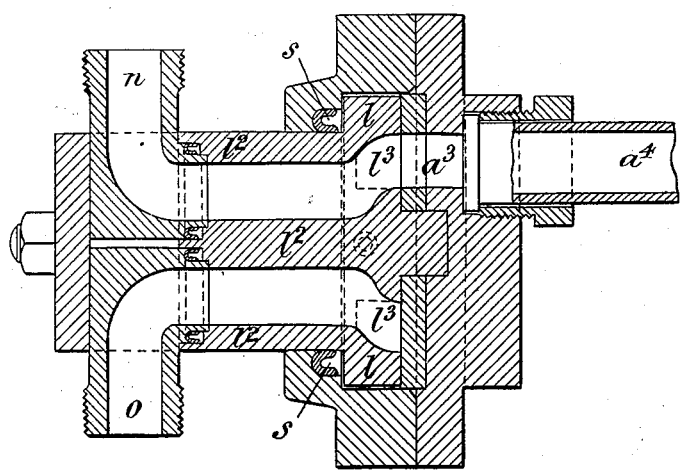
Figure 14:
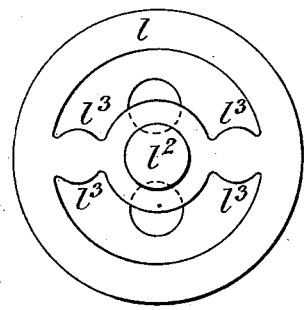
Figure 15:
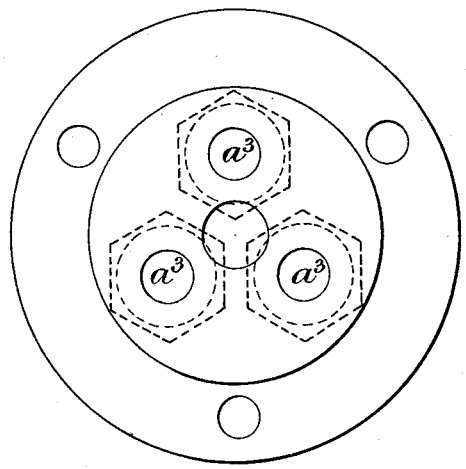
Figure 16:
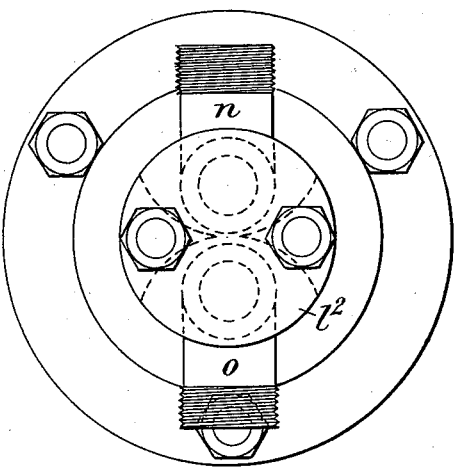

Fig. 1 is a vertical longitudinal section. Fig. 2 is an end elevation of the frame and upper valve-box. Fig. 3 is a plan of the upper valve-box. Fig. 4 is a face view of the ports in the valve-face leading to the cylinders. Fig. 5 is a face view of the valve resting against the valve-face. Fig. 6 is a longitudinal section of the mechanism for giving a partial turn in either direction to the cylindrical rod through which the crank-pin passes. Fig. 7 is a transverse section taken through the wheel. Figs. 2, 3, 4, 5, 6, and 7 are to a smaller scale than Fig. 1. Fig. 8 is a longitudinal elevation, partly in section. Figs. 9 and 10 are end views. Fig. 11 is a vertical transverse section through the cylinders. Fig. 12 is a vertical transverse section taken close to the cylinders. Fig. 13 is a longitudinal section through the valve mechanism. Fig. 14 is an end view of the valve; Fig. 15, an end view of the valve-face; Fig. 16, an end view of the valve-rod and pipes leading to and from it.

A is the wheel, A' a tubular axis extending from one side of it, and $A^2$ the boss or axis on the opposite side.

B are the radial cylinders carried by the wheel. They can each rock on trunnions B', as shown.

C are the rams working within the cylinders.

D is the fixed cylindrical axis around which the tubular axis A' of the wheel revolves. It is fixed at one end to the frame of the engine.

E is the cylindrical rod, passed through a hole bored eccentrically through the fixed axis D.

F is the crank-pin, passed through a hole bored eccentrically to the same extent through the cylindrical rod E, so that by giving a half-turn to the cylindrical rod the crank-pin can be brought concentric with the axis of the wheel or moved to its greatest distance away from the axis.

E' is a toothed wheel on the end of the cylindrical rod E. It has gearing with it on opposite sides two toothed racks G G'. These racks are formed on piston-rods or plungers, which work in two hydraulic cylinders H H'.

By suitable valve mechanism (not shown) water under pressure can be admitted to either cylinder, while at the same time it is allowed to escape from the other, or the passages to both cylinders can be closed. In this way a half-turn can be given to the rod, or it can be held in any intermediate position. Other mechanical means may be used for effecting this object in place of the racks and hydraulic cylinders.

In the drawings, Fig. 1, the tubular axis A' is shown not only to surround the fixed cylindrical axis D, but also to be supported within a concentric bearing I, carried by the frame of the engine. The boss or axis $A^2$, which is on the opposite side of the wheel A to the hollow axis A', is hollow, opening into the interior of the wheel, but closed at its outer end. To the inner face of the closed end is fixed a valve-face K, having in it three ports $A^3$, from which extend passages $A^4$ to the outer ends of the three cylinders B. L is the valve. It has two ports L' passing through it and is formed on the end of a rod $L^2$. The rod extends inward for a distance into the interior of the wheel. On its inner end is fixed a block $L^5$, which embraces a bar F', which extends radially from the end of the crank-pin F. Similarly the other end of the crank-pin has fixed to it a block, which embraces a radial arm M' on an axis M, which is concentric with the wheel and turns in a bearing carried by the frame of the engine, as shown in Fig. 1. In this way whenever the cylindrical rod E has a partial turn given to it and the crank-pin is consequently moved a distance around the axis of the wheel the valve-rod has also a corresponding partial turn given to it, so that the ports L' in the valve L are always maintained in the same position radially relatively to the crank-pin. N O are two annular water-spaces around the interior of the hollow boss $A^2$, between it and the rod $L^2$, and P Q are two similar annular water-spaces around the exterior of the boss, and between it and a casing R, fixed to the frame of the engine. P' Q' are passages formed at intervals between the water-spaces N and P and between the water-spaces O Q. S are cup-leathers for forming water-tight joints at the sides of the water-passages. $L^4$ is a passage extending through the rod $L^2$ from the annular water-passage N to one of the ports L' in the valve L, and $L^3$ is a similar passage extending from the annular water-passage O to the other port L'. T is a valve-face having through it two ports T' $T^2$, one opening into the annular water-space P and the other into the water-space Q. U is a valve bearing upon the top of the valve-face and formed upon the end of a rod V. W is a casing inclosing the valve and rod. X Y are two annular water-spaces around the rod V and between it and the casing W. One has water under pressure constantly supplied to it through a pipe Z, (see Figs. 2 and 3,) and the other opens into an outlet or exhaust pipe Z'. In this way by giving a half-turn in one or other direction to the valve-rod one port can be connected to the exhaust or to the supply while the other is connected to supply or exhaust, so that the engine can be revolved in either direction. Motion can be transmitted by a belt or otherwise from the exterior of the wheel A or from the axis $A^2$.

Figs. 8 to 16 of the drawings annexed show a similar engine to that just described, but with the valve-face on the outer side of the end of the wheel's axis and the parts modified accordingly. In these figures $a$ is the wheel, with cylinders $b$ radiating from it. One side of the wheel revolves around a bearing $d$, which is fixed to the frame of the engine. The other has an arm or axis $a^2$ extending from it, which at its end is received in another bearing on the frame. At the end of the axis $a^2$ is a valve-face having in it three ports $a^3$, ranged equidistantly around the center and with pipes $a^4$ leading from the ports to the outer ends of the cylinders. $l$ is the valve on the valve-rod $l^2$. The valve $l$ is held against the valve-face by water under pressure introduced to the space $s$ (see Fig. 13) at the back of the valve through a small passage (not shown) formed for the purpose. $l^3$ are two ports in the valve, with passages extending backward through the rod to two pipes $n$ $o$, connected to the rod by swiveling joints kept water-tight by cup-leathers, as shown. The pipes are led to two opposite sides of a valve-box $p$, which is formed with an inlet $p'$ for admitting water under pressure and an outlet $p^2$ for the exhaust and has within it a valve on a valve-stem $q$, by turning which either the pipe $n$ can have water under pressure admitted to it and the pipe $o$ opened to the exhaust or the pipe $o$ can be supplied with water under pressure and the pipe $n$ opened to the exhaust, or water can be turned off from both pipes and the engine stopped. $f$ is the crank-pin against which the rams of the cylinders thrust. It projects from the end of the cylindrical rod $e$ and is eccentric to it. The rod $e$ passes through a hole bored eccentrically to the same extent through the fixed bearing $d$. $e'$ is a yoke fixed on the outer end of the rod $e$. $e^2$ are rods descending from the ends of the yoke to two rams $e^3$, working in hydraulic cylinders $e^4$, to either of which water under pressure can be admitted while water is allowed to escape from the other. This may, as shown at Figs. 8 and 10, be done by leading pipes from the cylinders to the valve-box $p$, the valve contained in it being suitably formed not only for reversing the engine, but also for controlling the admission to and escape of water from the cylinders $e^4$ and so controlling the length of stroke of the rams, or a separate valve might be used for the purpose, and if the engine is desired to be kept running at a uniform speed the turning of the valve to cause the stroke of the rams to be longer or shorter may be under the control of a governor. In order as the crank-pin is moved around the center of the fixed bearing $d$ when being moved toward or away from it that the valve $l$ may be correspondingly turned, a connecting-rod is led downward from one arm of the yoke $e'$ to an arm $r'$ on a rock-shaft $r$, at the other end of which is an arm $r^2$, connected by a rod $r^3$ with an arm $r^4$, secured to the exterior of the valve-rod $l^2$. Motion can be transmitted by a belt or otherwise from the axis $a^2$ or a wheel fixed upon it, or it will serve as a barrel for winding up a rope.

The action of the engine shown in Fig. 1 is as follows: When the valve V is turned into the position shown in Fig. 1, water under pressure passes from the inlet supply-pipe Z (see Fig. 2) to the annular water-space X and through the port T' to the annular water-space P, and from thence, through the passages P', to the annular water-space N, and through the passage L⁴ to one of the two ports L', formed in the valve L. At the same time the other port L' is open to the exhaust through the passage L³, annular water-space O, passages Q', annular water-space Q, port T², and annular water-space Y to the outlet or exhaust pipe Z'. (See Fig. 2.) As, therefore, each of the three ports A³ in the revolving valve-face is by the rotation of the engine brought opposite to the port L', which is supplied with water under pressure, water under pressure passes through that port A³ and through a passage A⁴, leading from it to the outer end of one of the cylinders B, thereby causing the ram of that cylinder to thrust against the crank-pin F, which remains at rest. At the same time the outer end of another of the cylinders is similarly opened to the exhaust. Consequently the wheel which carries the cylinders is forced to revolve. If the speed of the engine becomes either too fast or too slow, the attendant admits water under pressure to one of the cylinders H or H' (see Fig. 6) and opens the other cylinder to the exhaust, and thereby gives a partial turn in one or other direction to the rod E. By thus turning the rod E the crank-pin F is moved through a curved course either nearer to or farther from the central axial line of the revolving wheel, and the length of stroke of the rams C of the cylinders B is thereby shortened or lengthened. As by the turning of the rod E the crank-pin F is not only moved nearer to or farther from the central axial line of the revolving wheel A, but is also carried a distance around this axis, the bar F' on its end causes the rod L² and the valve L on its end to make a corresponding turn. Consequently the position of the valve-ports relatively to the position of the crank-pin always remains the same and the efficient working of the engine remains unaffected.

The action of the engine shown in Fig. 8 is as follows: When the valve-stem $q$ is turned into such a position that the inlet supply-pipe $p'$ supplies water under pressure to the pipe $n$, while the pipe $o$ is open to the outlet or exhaust pipe $p^2$, one of the two ports $l^3$ of the valve $l$ (see Fig. 13) is supplied with water under pressure, while the other is open to the exhaust. As each of the three ports $a^3$ in the revolving valve-face is by the rotation of the engine brought opposite to the port $l^3$, which is supplied with water under pressure, water under pressure passes through it and through the pipe $a^4$, leading from it, to the outer end of one of the cylinders B, thereby causing the ram of that cylinder to thrust against the crank-pin $f$, which remains at rest. At the same time the outer end of another of the cylinders is similarly opened to the exhaust. Consequently the wheel which carries the cylinders is forced to revolve. If the speed of the engine becomes either too fast or too slow, the attendant by giving a partial turn to the valve-stem $q$ admits water under pressure to one or other of the cylinders $e^4$, (see Fig. 10,) while at the same time the other is opened to the exhaust, and thereby a partial turn in one or other direction is given to the rod $e$. By thus turning the rod $e$ the crank-pin $f$ is moved through a curved course either nearer to or farther from the central axial line of the revolving wheel, and the length of stroke of the rams $c$ of the cylinders $b$ is thereby shortened or lengthened. As by the turning of the rod $e$ the crank-pin $f$ is not only moved nearer to or farther from the central axial line of the revolving wheel $a$, but is also carried a distance around this axis, the valve $l$ is at the same time caused to make a corresponding partial turn around this axis by reason of the rod being geared with the valve through connecting-rod leading from yoke $e'$ to arm $r'$, rock-shaft $r$, arm $r^2$, connecting-rod $r^3$, and arm $r^4$. Consequently the position of the valve-ports relatively to the position of the crank-pin always remains the same and the efficient working of the engine remains unaffected.

What I claim is—

1. The combination of the hollow wheel, its two axes, the cylinders mounted radially on the wheel, their rams, the valve-face on one axis with ports in it from which passages extend to the outer ends of the cylinders, the valve held against rotation fitting against the valve-face and having ports in it one supplied with fluid under pressure the other an outlet-port, the fixed cylindrical axis around the exterior of which the other axis of the wheel revolves, the rod which passes through a hole bored eccentrically through this fixed axis, the crank-pin extending from the end of the rod and eccentric to it for the rams of the cylinders to bear against, means for giving a partial turn to the rod and retaining it in any desired position to hold the crank-pin at the required distance from the central axis of the wheel and means for at the same time turning the valve around the central axis to the same extent as the crank-pin is moved around this axis at the time when it is being moved toward or away from it.

2. The combination of the hollow wheel, its two axes, the cylinders mounted radially on the wheel, their rams, the valve-face at the end of one axis with ports in it from which passages extend to the outer ends of the cylinders, the valve held against rotation fitting against the valve-face and having ports in it one supplied with fluid under pressure, the other an outlet-port, the fixed cylindrical axis around the exterior of which the other axis of the wheel revolves, the rod which passes through a hole bored eccentrically through this fixed axis, the crank-pin extending from the end of the rod and eccentric to it for the rams of the cylinders to work against, means for giving a partial turn to the rod and retaining it in any desired position, the rock-shaft connected with and having motion given to it at one end from the rod, when the rod is turned, and at the opposite end connected with and giving to the valve a turning movement corresponding to that of the rod substantially as described.

3. The combination of the hollow wheel, the hydraulic cylinders mounted radially on the wheel their rams the fixed axis around which, one side of the wheel revolves, the rod passing eccentrically through the fixed axis, the crank-pin extending from the end of the rod and eccentric to it for the rams of the cylinders to work against, and means for giving a partial turn to the rod, and retaining it in any desired position, to hold the crank-pin at any distance from the central axis of the wheel.

4. The combination of the hollow wheel, the hydraulic cylinders mounted radially on the wheel, their rams, the fixed axis, around which one side of the wheel revolves, the rod passing eccentrically through the fixed axis, the crank-pin extending from the end of the rod and eccentric to it for the rams of the cylinders to work against, projections from opposite sides of the rod connected with the rams of two hydraulic cylinders, and means for admitting liquid under pressure to one cylinder at the same time that it is allowed to escape from the other, or for stopping the passage of liquid to or from both cylinders, so as either to give a partial return to the rod in either direction or lock it in whatever position it may have been turned into.

5. The combination of the hollow wheel, the hydraulic cylinders mounted radially on the wheel their rams the fixed axis forming a support for the wheel, and around which the wheel revolves, and the crank-pin extending beyond and supported by the fixed axis for the rams of the hydraulic cylinders to work against.

BRICE TYDEMAN.

Witnesses:
   GEO. J. B. FRANKLIN,
   WALTER J. SKERTEN.